US010462805B2

(12) United States Patent
Belghoul et al.

(10) Patent No.: US 10,462,805 B2
(45) Date of Patent: Oct. 29, 2019

(54) LAA/WIFI COEXISTENCE FOR 5GHZ ANTENNA SHARING

(71) Applicant: Apple Inc., Cupertino, CA (US)

(72) Inventors: Farouk Belghoul, Campbell, CA (US); Paul V. Flynn, Menlo Park, CA (US); Louie J. Sanguinetti, Los Gatos, CA (US); Bernd W. Adler, Saratoga, CA (US); Christian W. Mucke, Cupertino, CA (US); Joseph Hakim, Soquel, CA (US); Ronald W. Dimpflmaier, Los Gatos, CA (US); Matthias Sauer, San Jose, CA (US); Tushar R. Shah, Cupertino, CA (US); Daniel R. Borges, San Francisco, CA (US); Rafael L. Rivera-Barreto, Santa Clara, CA (US); Cesar Perez, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 15/711,061

(22) Filed: Sep. 21, 2017

(65) Prior Publication Data
US 2018/0092109 A1 Mar. 29, 2018

Related U.S. Application Data

(60) Provisional application No. 62/398,777, filed on Sep. 23, 2016, provisional application No. 62/421,766, filed on Nov. 14, 2016.

(51) Int. Cl.
*H04W 72/12* (2009.01)
*H04B 7/06* (2006.01)
(Continued)

(52) U.S. Cl.
CPC ...... *H04W 72/1215* (2013.01); *H04B 7/0632* (2013.01); *H04W 16/14* (2013.01);
(Continued)

(58) Field of Classification Search
None
See application file for complete search history.

(56) References Cited

U.S. PATENT DOCUMENTS 7,515,910 B2 * 4/2009 Qiao ............. H04W 36/30
370/331
8,095,175 B2 * 1/2012 Todd ............. H04W 36/18
370/328
(Continued)

FOREIGN PATENT DOCUMENTS

WO WO 2016/145601 9/2016

OTHER PUBLICATIONS

Samsung; "Extending the IDC Framework for LAA", 3GPP Draft; R2-154370 LAA Wifi Indication_Final, 3rd Generation Partnership Project (3GPP), Mobile Competence Centre; 650, Route Des Lucioles; F-06921 Sophia-Antipolis Cedex; France, vol. RAN WG2, No. Malmo, Sweden; Oct. 4, 2015, XP051004946, Retrieved from the Internet: URL:http://www.3gpp.org/ftp/Meetings_3GPP SYNC/RAN2/Docs/.

(Continued)

Primary Examiner — Gregory B Sefcheck
(74) Attorney, Agent, or Firm — Meyertons Hood Kivlin Kowert and Goetzel PC; Jeffrey C. Hood; Michael B. Davis

(57) ABSTRACT

A wireless communication device (UE) includes a cellular processor configured to conduct wireless communications according to a first radio access technology (RAT) in a first frequency band and in a second frequency band, wherein the first RAT is a cellular RAT, the first frequency band is in an unlicensed spectrum, and the second frequency band is in a licensed spectrum. In some embodiments, the apparatus includes a wireless local area network (WLAN) processor configured to conduct wireless communications according to a second RAT in the first frequency band. In some
(Continued)

embodiments, the cellular processor and the WLAN processor are configured to couple to a common antenna for communications in the first frequency band. In some embodiments, the cellular processor may notify the WLAN processor when it is scanning and/or when it is assigned secondary component carriers in the first frequency band. In some embodiments, the WLAN processor may notify the cellular processor when it is transmitting. In some embodiments, the WLAN processor and/or the cellular processor may perform one or more actions in response to such notifications to improve coexistence in the first frequency band.

17 Claims, 16 Drawing Sheets

(51) Int. Cl.
   *H04W 16/14* (2009.01)
   *H04W 72/04* (2009.01)
   *H04W 24/10* (2009.01)
   *H04W 74/06* (2009.01)
   *H04W 72/08* (2009.01)
   *H04W 74/08* (2009.01)
   *H04W 88/06* (2009.01)

(52) U.S. Cl.
   CPC ..... *H04W 72/0446* (2013.01); *H04W 72/085* (2013.01); *H04W 24/10* (2013.01); *H04W 74/06* (2013.01); *H04W 74/0816* (2013.01); *H04W 88/06* (2013.01)

(56) References Cited

U.S. PATENT DOCUMENTS

| | | | | |
|---|---|---|---|---|
| 8,934,387 | B2* | 1/2015 | He | H04W 52/0238 |
| | | | | 370/311 |
| 9,026,162 | B2 | 5/2015 | Wagholikar et al. | |
| 9,167,486 | B2* | 10/2015 | Bachmann | H04L 63/164 |
| 9,414,430 | B2* | 8/2016 | Vajapeyam | H04W 24/10 |
| 9,432,815 | B2* | 8/2016 | Edge | H04W 4/04 |
| 9,445,278 | B2* | 9/2016 | Sadek | H04W 16/14 |
| 9,491,632 | B2* | 11/2016 | Sadek | H04W 72/1215 |
| 9,537,642 | B2* | 1/2017 | Belghoul | H04W 28/085 |
| 9,699,801 | B2* | 7/2017 | Smadi | H04W 72/1215 |
| 9,775,153 | B2* | 9/2017 | Khawer | H04W 72/0453 |
| 9,825,748 | B2* | 11/2017 | Liang | H04W 28/085 |
| 9,853,797 | B2* | 12/2017 | Tabet | H04W 28/085 |
| 9,893,758 | B2* | 2/2018 | HomChaudhuri | H04W 76/38 |
| 9,955,503 | B2* | 4/2018 | Sadek | H04W 74/0808 |
| 9,974,089 | B2* | 5/2018 | Salem | H04W 72/085 |
| 9,992,723 | B2* | 6/2018 | Katar | H04W 36/30 |
| 10,080,142 | B2* | 9/2018 | Rico Alvarino | H04L 5/0048 |
| 10,314,054 | B2* | 6/2019 | Pao | H04W 72/085 |
| 2005/0250496 | A1* | 11/2005 | Hason | G01S 5/0257 |
| | | | | 455/436 |
| 2008/0259882 | A1* | 10/2008 | Abdel-Kader | H04W 48/16 |
| | | | | 370/338 |
| 2012/0329515 | A1* | 12/2012 | Husted | H04W 52/226 |
| | | | | 455/552.1 |
| 2014/0378157 | A1* | 12/2014 | Wei | H04W 16/14 |
| | | | | 455/454 |
| 2015/0163752 | A1* | 6/2015 | Appleton | H04W 52/243 |
| | | | | 370/252 |
| 2015/0163801 | A1* | 6/2015 | Sadek | H04W 72/0446 |
| | | | | 370/336 |
| 2015/0181514 | A1 | 6/2015 | Belghoul et al. | |
| 2015/0222410 | A1* | 8/2015 | Belghoul | H04W 28/085 |
| | | | | 370/252 |
| 2015/0223115 | A1* | 8/2015 | Liang | H04W 28/085 |
| | | | | 370/235 |
| 2015/0223243 | A1* | 8/2015 | Tabet | H04W 28/085 |
| | | | | 370/330 |
| 2016/0119797 | A1 | 4/2016 | Das et al. | |
| 2016/0127057 | A1* | 5/2016 | Yang | H04B 17/345 |
| | | | | 370/252 |
| 2016/0233989 | A1* | 8/2016 | Belghoul | H04L 1/1887 |
| 2016/0345345 | A1* | 11/2016 | Malik | H04W 48/04 |
| 2017/0048916 | A1* | 2/2017 | Yoo | H04B 17/318 |
| 2017/0111888 | A1* | 4/2017 | Dinan | H04W 72/042 |
| 2017/0230818 | A1* | 8/2017 | Park | H04W 8/02 |
| 2018/0077643 | A1* | 3/2018 | Dinan | H04W 52/0216 |

OTHER PUBLICATIONS

International Search Report and Written Opinion, Application No. PCT/US2017/053459, dated Jan. 25, 2018, 13 pages.

* cited by examiner

LAA/WIFI COEXISTENCE FOR 5GHZ ANTENNA SHARING

PRIORITY CLAIMS

This application claims the benefit of U.S. Provisional Application No. 62/398,777, filed on Sep. 23, 2016 and U.S. Provisional Application No. 62/421,766, filed on Nov. 14, 2016, each of which is incorporated by reference herein in its respective entirety.

TECHNICAL FIELD

The present application relates to wireless communications, and more particularly to co-existence between Wi-Fi and LAA/LTE communications using a shared antenna.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications.

The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, Wi-Fi, BLUETOOTH™, etc.). The radio interfaces may be used by various applications and the presence of the multiple radio interfaces may necessitate the UE to implement mobility solutions to seamlessly run applications simultaneously over multiple radio interfaces (e.g., over LTE/LTE-A and BLUETOOTH™) without impacting the end-to-end performance of the application. That is, the UE may need to implement mobility solutions to simultaneously operate multiple radio interfaces corresponding to multiple RATs (e.g., LTE/LTE-A, Wi-Fi, BLUETOOTH™, etc.).

In addition to the communication standards mentioned above, there also exist extensions aimed at boosting transmission coverage in certain cellular networks. For example, LTE in Unlicensed spectrum (LTE-U) allows cellphone carriers to boost coverage in their cellular networks by transmitting in the unlicensed 5 GHz band which is also used by many Wi-Fi devices. License Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. In some cases, the coexistence of cellular and Wi-Fi communications in the same band can result in the degradation of data throughput and/or decreased performance of streaming applications (data streaming) when both Wi-Fi signals and LAA/LTE-U signals are present. Furthermore, cellular communications conducted in the unlicensed band(s) oftentimes require increased power consumption in comparison to cellular communications conducted in the licensed band(s).

SUMMARY

Embodiments are presented herein of techniques for Wi-Fi and LAA coexistence using a common antenna.

In some embodiments, an apparatus includes a cellular processor configured to conduct wireless communications according to a first radio access technology (RAT) in a first frequency band and in a second frequency band, wherein the first RAT is a cellular RAT, the first frequency band is in an unlicensed spectrum (e.g., in a 5 GHz band), and the second frequency band is in a licensed spectrum. In some embodiments, the first RAT is a cellular RAT such as LTE. In some embodiments, the apparatus includes a wireless local area network (WLAN) processor configured to conduct wireless communications according to a second RAT in the first frequency band. In some embodiments, the cellular processor and the WLAN processor are configured to couple to a common antenna for communications in the first frequency band.

In some embodiments, the WLAN processor is configured to indicate one or more transmission intervals by notifying the cellular processor when the WLAN processor is transmitting via the antenna. In some embodiments, the cellular processor is configured to determine whether to request (e.g., from a base station) deactivation of communications via the first frequency band based on one or more durations of the one or more transmission intervals.

In some embodiments, the cellular processor is configured to send a message to the WLAN processor in response to allocation of one or more secondary component carriers in the first frequency band to the cellular processor by a cellular base station. The message may list the one or more secondary component carriers. The cellular processor may use similar messages to indicate one or more secondary component carriers (e.g., carriers from other neighboring base stations) on which measurements are to be performed. In some embodiments, the message includes a list of secondary component carriers in the first frequency band. In some embodiments, the WLAN processor is configured to avoid transmitting (e.g., cancel or delay scheduled transmissions) on ones of the indicated secondary component carriers. In some embodiments, the the WLAN processor is configured, in response to the message, to refrain from sending an acknowledgement to a probe from a wireless access point in the first frequency band. In some embodiments, the WLAN processor is configured to reduce a rate of active scanning in the first frequency band in response to the message. In some embodiments, the WLAN processor is configured to use an increase aggregation of media access control protocol data units (AMPDU) in response to the message and/or WMM in response to the message.

In some embodiments, the cellular processor is configured to notify the WLAN processor when the cellular processor is performing a scan during a scan interval in the first frequency band. In some embodiments, the WLAN processor is configured to cancel or defer one or more scheduled transmissions during the scan interval. In some embodiments, in response to a determination not to defer one or more transmissions during the interval, the WLAN processor is configured to notify the cellular processor that the WLAN processor transmitted during the interval. In some embodiments, in response to the notification that the WLAN processor transmitted during the interval, the cellular processor is configured to ignore one or more scan measurements taken during an interval in which the WLAN processor transmitted.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
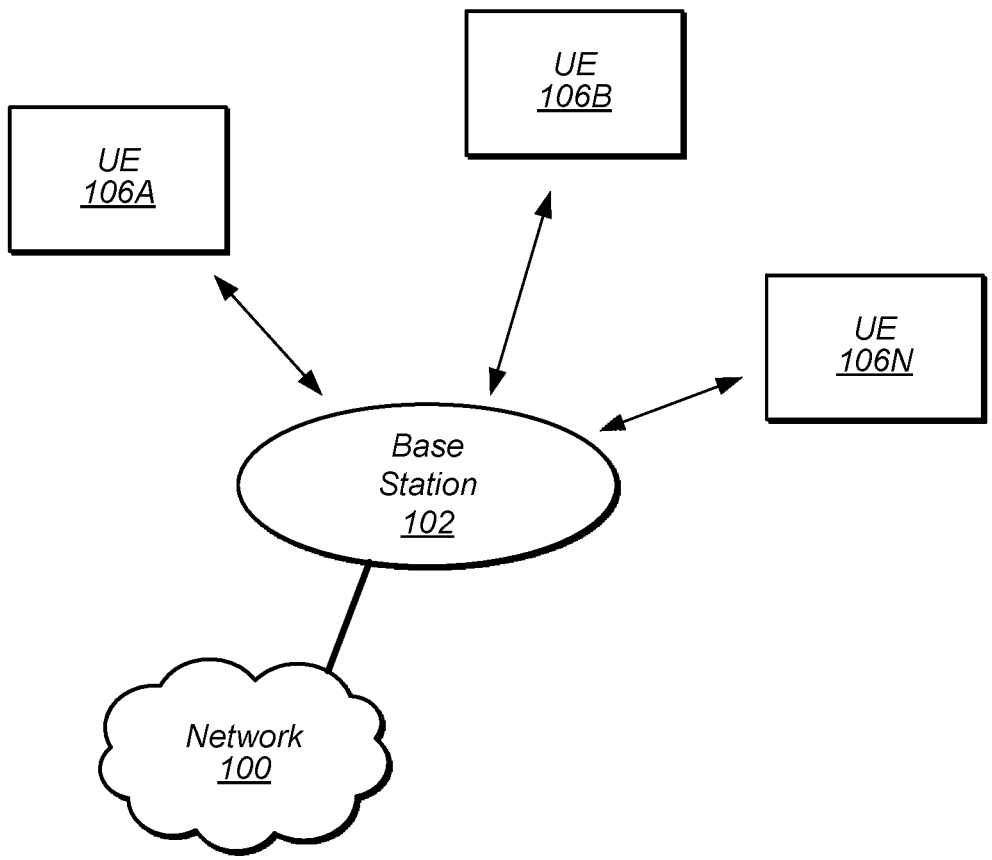
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledgement
APR: Applications Processor
BS: Base Station
BSR: Buffer Size Report
CC: Component Carrier
CMR: Change Mode Request
CQI: Channel Quality Indicator
DL: Downlink (from BS to UE)
DYN: Dynamic
FDD: Frequency Division Duplexing
FT: Frame Type
GPRS: General Packet Radio Service
GSM: Global System for Mobile Communication
HARQ: Hybrid Automatic Repeat Request
IE: Information Element
LAN: Local Area Network
LBT: Listen Before Talk
LTE: Long Term Evolution
LTE-U: LTE in Unlicensed Spectrum
LAA: License Assisted Access
MAC: Media Access Control (layer)
NACK: Negative Acknowledgement
PCell: Primary Cell
PDCCH: Physical Downlink Control Channel
PDSCH: Physical Downlink Shared Channel
PDN: Packet Data Network
PDU: Protocol Data Unit
PUCCH: Physical Uplink Control Channel
QoS: Quality of Service
RAT: Radio Access Technology
RF: Radio Frequency
RTP: Real-time Transport Protocol
RX: Reception/Receive
SCell: Secondary Cell
TBS: Transport Block Size
TDD: Time Division Duplexing
TTI: Transmission Time Interval
TX: Transmission/Transmit
UCI: Uplink Control Information
UE: User Equipment (Device)
UL: Uplink (from UE to BS)
UMTS: Universal Mobile Telecommunication System VoLTE: Voice over LTE WLAN: Wireless LAN Wi-Fi: Wireless Local Area Network (WLAN) RAT based on the Institute of Electrical and Electronics Engineers' (IEEE) 802.11 standards Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
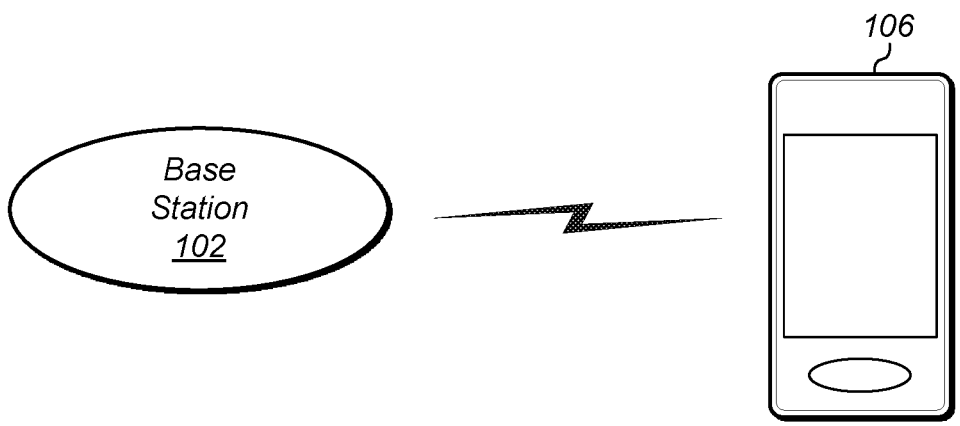
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate according to techniques detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to operate with reduced power consumption at the receiver front-end, at least according to the various methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
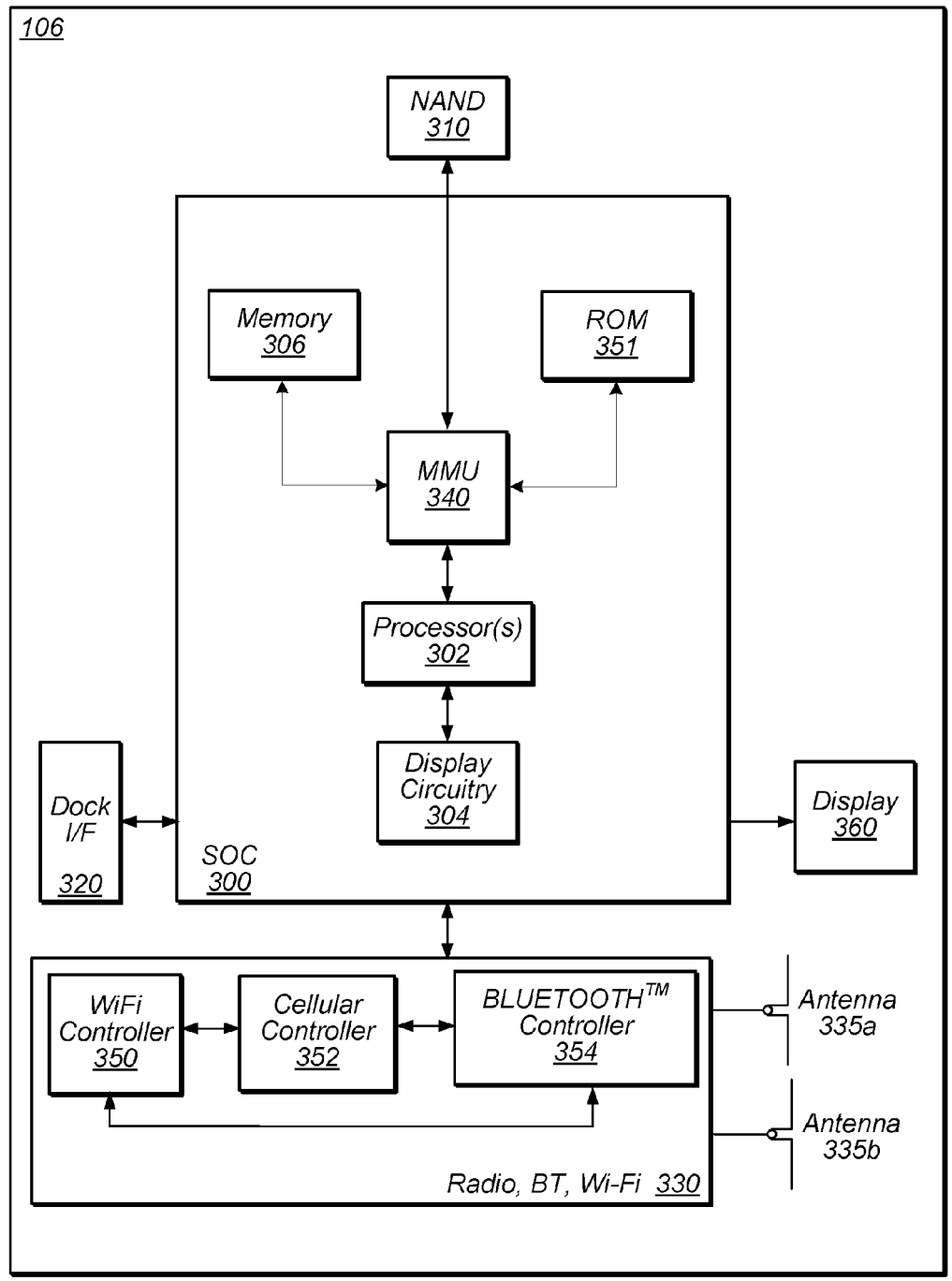
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 351, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate mitigating the potential effects of LAA/LTE imbalance for wireless communications of UE 106, according to various embodiments disclosed herein. Specifically, processor(s) 302 may be coupled to and/or may interoperate with other components as shown in FIG. 3 to facilitate UE 106 communicating in a manner that seeks to minimize imbalance between LAA and LTE communications of UE 106. Processor(s) 302 may also implement various other applications and/or end-user applications running on UE 106.

In some embodiments, radio 330 includes separate controllers dedicated to controlling communications for various respective RAT standards. For example, as shown in FIG. 3, radio 330 may include a Wi-Fi controller 350, a cellular controller (e.g. LTE/3GPP controller) 352, and BLUETOOTH' controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH' controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
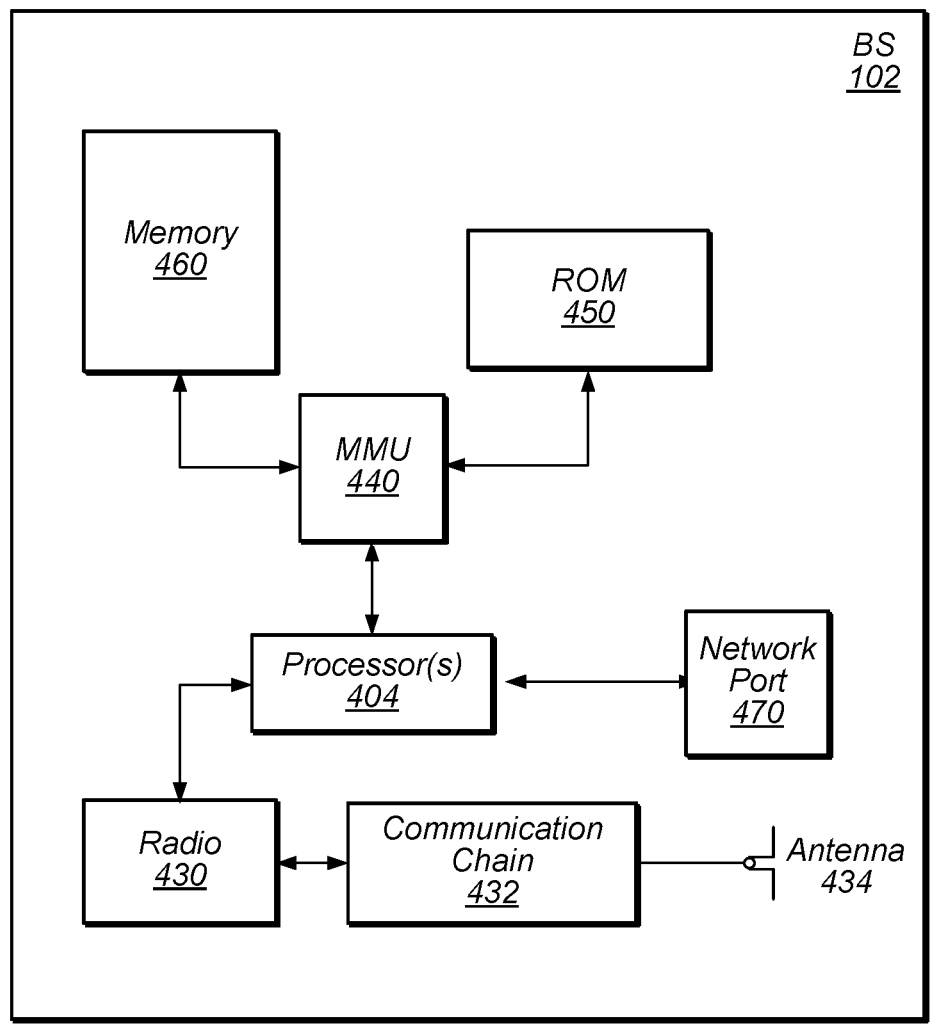
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein, e.g., by executing program instructions stored on a memory medium (e.g., a non-transitory computer-readable memory medium), for base station 102 to communicate with a UE device capable of detecting an imbalance between LAA and LTE communications performed by the UE device, and making adjustments to account for such imbalances. Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of detecting an imbalance between LAA and LTE cellular wireless communications of the mobile devices, and adjusting their wireless operations accordingly, when applicable.

Figure 5:
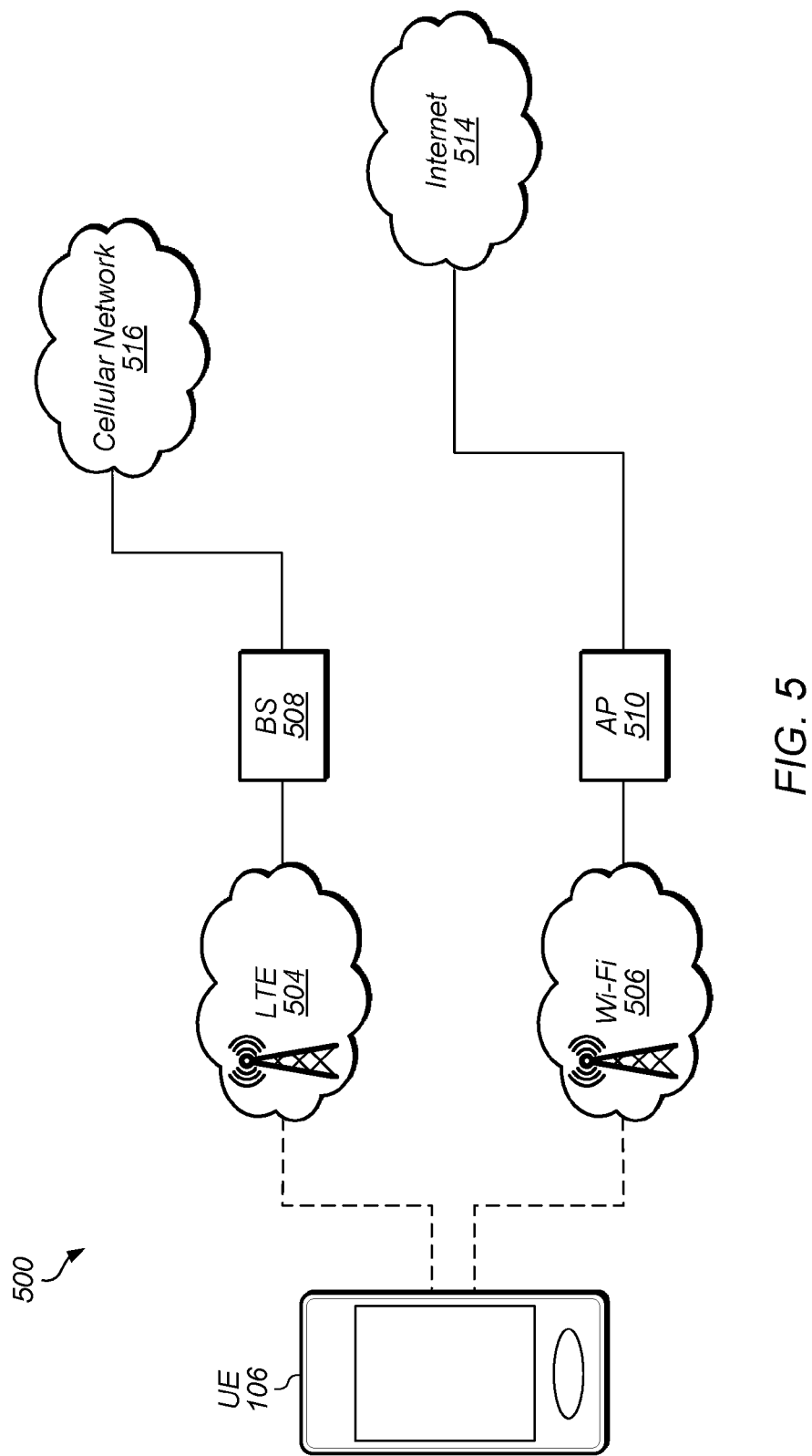
FIG. 5 illustrates an exemplary wireless communication system, according to some embodiments.

FIG. 5—Exemplary Communication System

FIG. 5 illustrates an exemplary wireless communication system 500 in accordance with some embodiments. System 500 is a system in which an LTE access network and a Wi-Fi radio access network are implemented. The system 500 may include UE 106 and LTE network 504 and Wi-Fi network 506.

LTE access network 504 is representative of some embodiments of a first RAT access and Wi-Fi access network 506 is representative of some embodiments of a second RAT access. LTE access network 504 may be interfaced with a broader cellular network (e.g. LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP), which may in turn provide access to the Internet 514. UE 106 may accordingly access Internet 514 via AP 510 and cellular network 516 via LTE access network 504. In some embodiments, though not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

Figure 6:
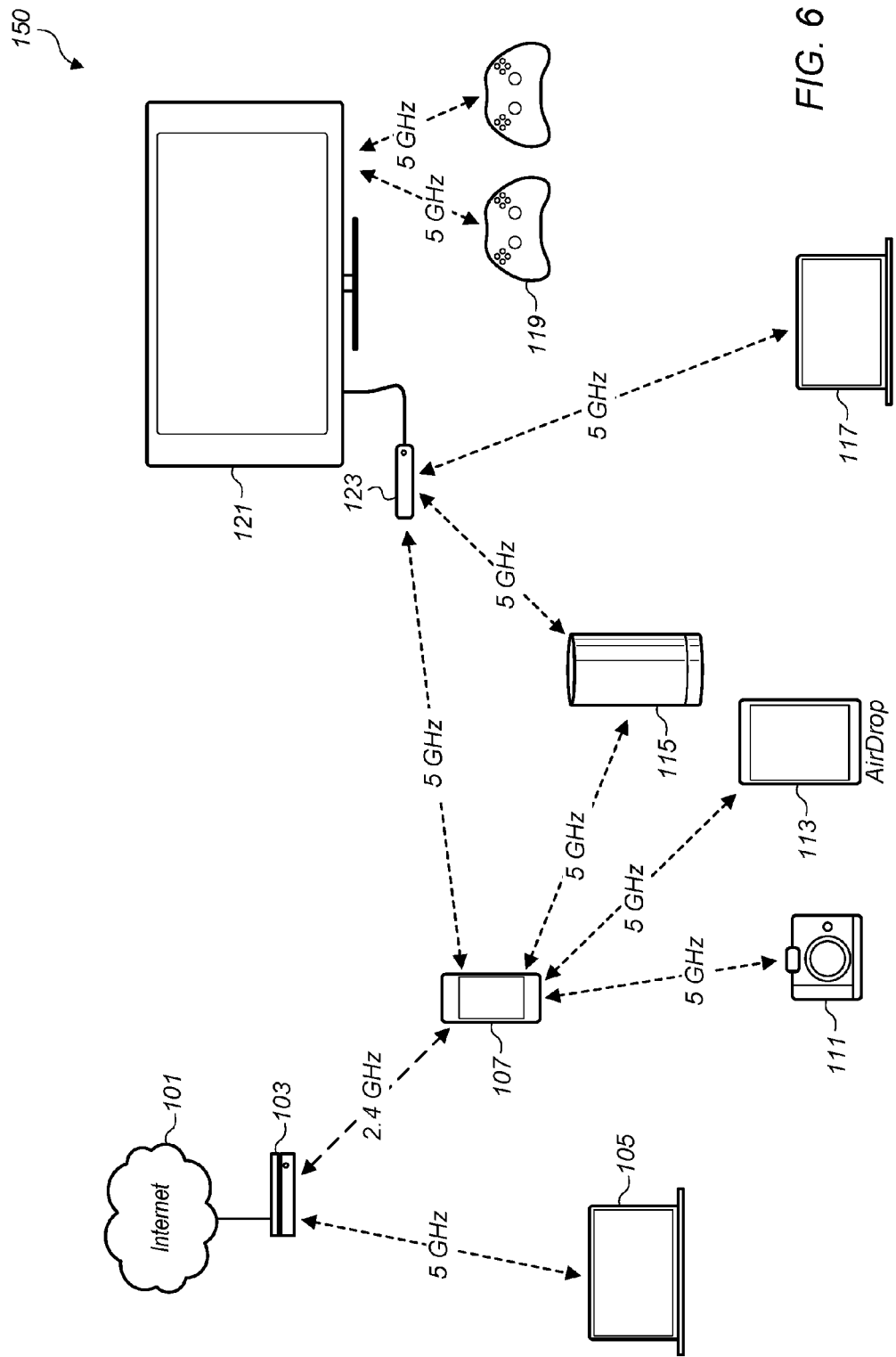
FIG. 6 shows an exemplary communication system in which multiple different devices may communicate with each other over specific band, such as 2.4 GHz and/or 5 GHz frequency bands using Wi-Fi.

FIG. 6—Exemplary Communication System with Multiple Wi-Fi Devices

FIG. 6 shows an exemplary communication system in which multiple different devices may communicate with each other over specific band, such as 2.4 GHz and/or 5 GHz frequency bands using Wi-Fi RAT. 5 GHz Wi-Fi (IEEE 802.11 ac/n) capable devices have become quite common, operating in both peer-to-peer mode and/or station mode, as shown in FIG. 6. Data communications over specific frequency band, e.g. over the 5 GHz band may include Voice, Video, real time and best effort type of traffic. Illustrated devices include cameras (111), tablets (113), media servers/mini-servers (115), portable computers (105, 117), access ports/routers (103), game controllers (119), mobile devices such as smart phones (107), and smart monitors (121) or monitors with wireless access interface (121 together with 123). As shown in FIG. 6, many of the devices may communicate over the 5 GHz band, using Wi-Fi communication technology. In some cases the Wi-Fi communications conducted by the devices may be affected by LAA/LTE-U communications also taking place over the 5 GHz band.

Presence of LAA/LTE-U Signals

In LTE, carrier aggregation (CA) refers to two or more component carriers (CCs) being aggregated in order to support wider transmission bandwidths, e.g. bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (PCell), and Secondary Cells (SCells) together with the PCell may form a set of serving cells. In CA, a UE may be scheduled via PDCCH over multiple serving cells simultaneously. Cross-carrier scheduling with the Carrier Indicator Field (CIF) allows the PDCCH of a serving cell to schedule resources on another serving cell. That is, a UE receiving a downlink assignment on one CC may receive associated data on another CC.

Figure 7:
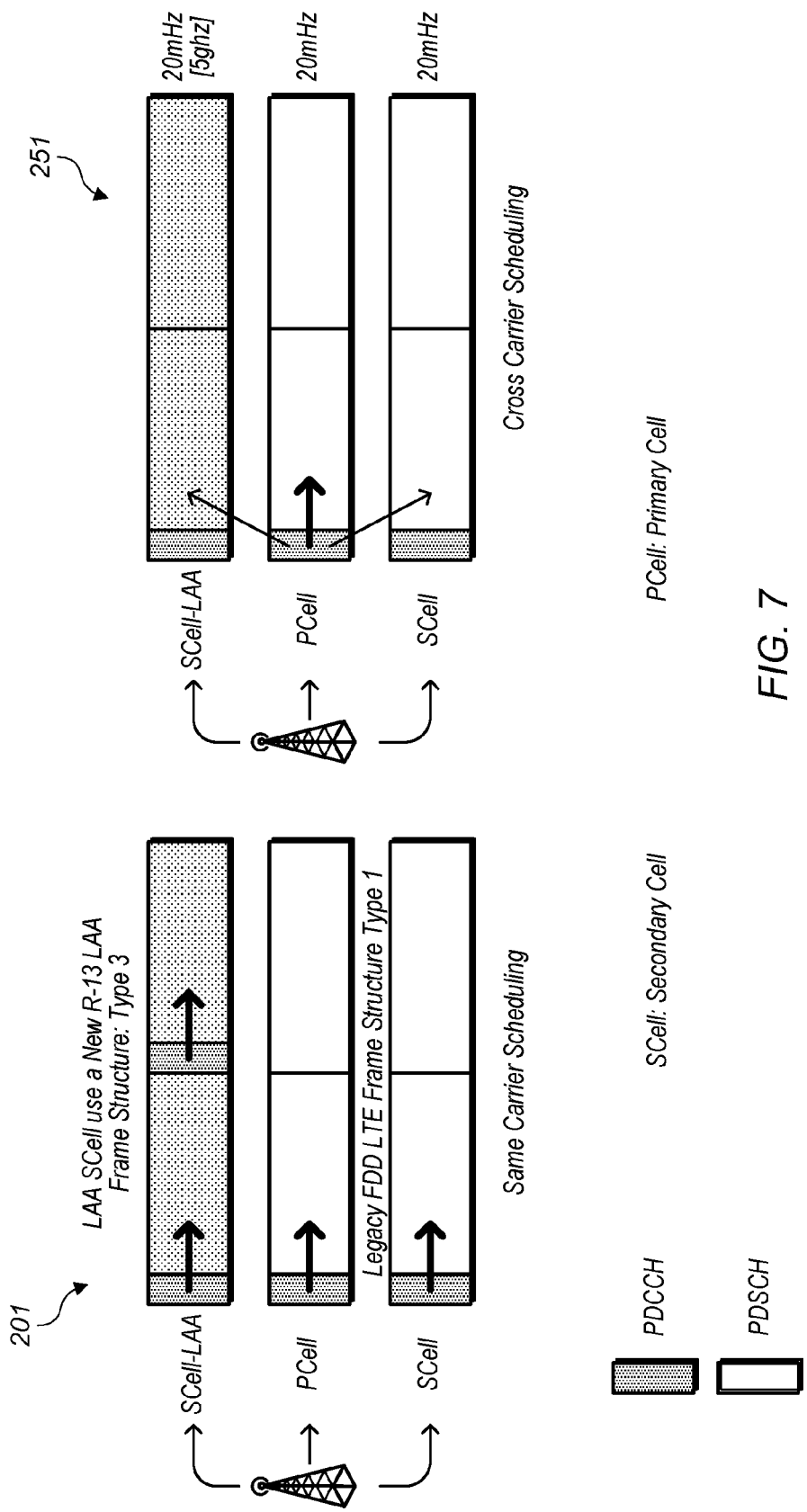
FIG. 7 shows an example of typical LAA control and data scheduling, according to some embodiments.

LAA (licensed assisted access) is a sub-category of LTE inter-band carrier aggregation, where one of the secondary carriers is operating in a 5 GHz unlicensed band, a band over which communications according to another RAT, such as Wi-Fi, may also be taking place. Resources in an LAA carrier are scheduled in the same manner that resources are scheduled in legacy carrier aggregation (CA). That is, carrier scheduling and/or cross layer scheduling for LAA carriers are the same as for other CA carriers (PDCCH or ePDCCH). An LAA SCell may operate in a frame structure 3 composed of 20 slots and may be accessed following a successful listen-before-talk (LBT) procedure. FIG. 7 shows an example of typical LAA control and data scheduling, providing a respective example for same carrier scheduling (201) and a respective example for cross carrier scheduling (251), assuming a successfully completed LBT procedure in the previous subframe. If a start position of the RRC subframe indicates 's07', and no DCI is received in slot 1, the UE may read the PDCC/ePDCCH of slot 2 to check downlink data availability.

Use of Unlicensed Spectrum and LAA

Cellular traffic is expected to grow exponentially between 2015 and 2020. For example, mobile data traffic is forecast to increase from 3.7 Exabytes, or EB (~$3.7*10^{18}$ bytes) per month in 2015 to 30.6 EB per month in 2020. However, the Licensed Spectrum is considered a major bottleneck preventing operators from expanding network capacity. During the latest Advanced Wireless Services (AWS)-3/79 spectrum auction, U.S. operators spent upwards of $44.9 Billion in the 65 MHz spectrum. The 5 GHz unlicensed band on the other hand represents up to 500 MHz of available bandwidth at zero auction cost. Therefore, LAA represents at least one approach applicable to solving this very same spectrum problem.

Figure 8:
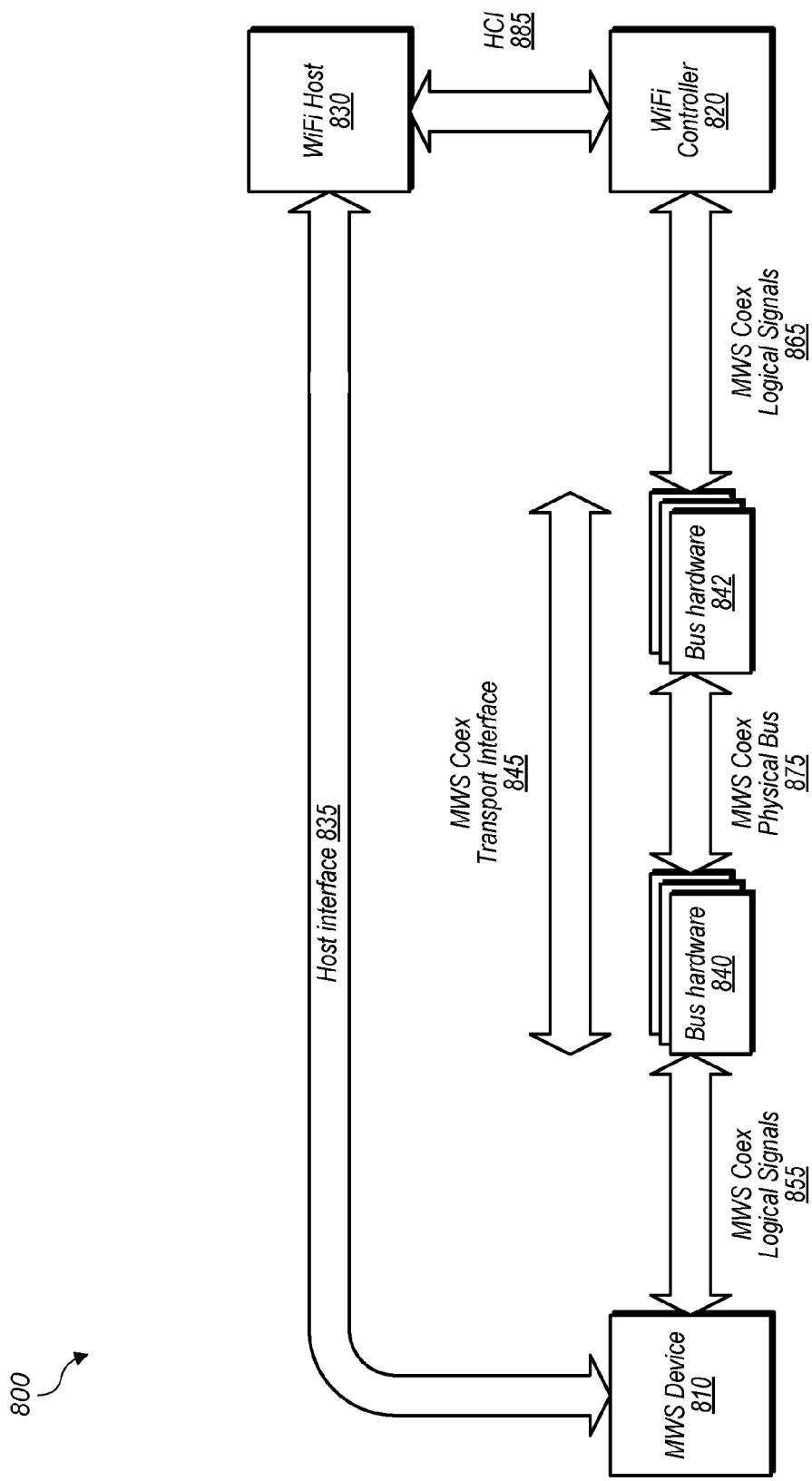
FIG. 8 is a block diagram illustrating exemplary communications interfaces between MWS and Wi-Fi processors, according to some embodiments.

Exemplary Techniques for Co-Existence Between LAA and Wi-Fi Using a Shared Antenna FIG. 8 is a block diagram illustrating an exemplary portion of a device 800 that includes a mobile wireless system (MWS) device 810 and Wi-Fi controller 820. In some embodiments, MWS device 810 corresponds to cellular controller 352 and Wi-Fi controller 820 corresponds to Wi-Fi controller 350. In the illustrated embodiment, device 800 also includes a Wi-Fi host 830 (which may correspond to processor(s) 302) and bus hardware 840 and 842. MWS device 810 may also be referred to as a cellular processor.

MWS device 810, in the illustrated embodiment, is configured to communicate with the Wi-Fi host 830 via host interface 835, which may be implemented using any of various protocols such as PCIe, for example. Wi-Fi controller 820, in the illustrated embodiment, is configured to communicate with Wi-Fi host 830 via a host interconnect interface (HCI) 885. In the illustrated embodiment, MWS device 810 and Wi-Fi controller 820 are configured to communicate with each other via MWS coexistence transmit interface 845. In some embodiments, this interface uses a wireless co-existence interface (WCI)-2 protocol, but in other embodiments any of various interfaces such as general purpose I/O (GPIO) or other interfaces may be implemented for similar communications.

In some embodiments, MWS device 810 and Wi-Fi controller 820 share an antenna for LAA and Wi-Fi transmissions respectively in the 5 GHz band. Therefore, in some embodiments, MWS device 810 and Wi-Fi controller 820 are configured to communicate via interface 845 and take action based on various signals in order to reduce interference in transmission. In other embodiments, similar techniques may be used to reduce interference between different antennas used for cellular and Wi-Fi communications in the same frequency band.

In various embodiments, a cellular processor and Wi-Fi processor may be implemented on different chips or integrated circuits, or on the same chip or integrated circuit. In some embodiments, a single processor implements both a cellular processor and a Wi-Fi processor, e.g., by executing different control programs for Wi-Fi and cellular. Portions of each processor may be implemented using dedicated circuitry, processing elements, programmable hardware elements, etc. The present disclosure is intended to encompass all such embodiments, among others.

In some embodiments, cellular DL transmissions are performed in LAA bands while all cellular UL transmissions are performed using licensed bands. In some embodiments, Wi-Fi transmission and reception are both performed in the 5 GHz band using the shared antenna. Further, various elements such as a diplexer, low-noise amplifier, band filter, etc. may be shared between Wi-Fi and LAA communications by the UE. In various embodiments, switching antennas may involve switching whether a Wi-Fi controller or a cellular controller is using these additional shared elements.

Figure 9:
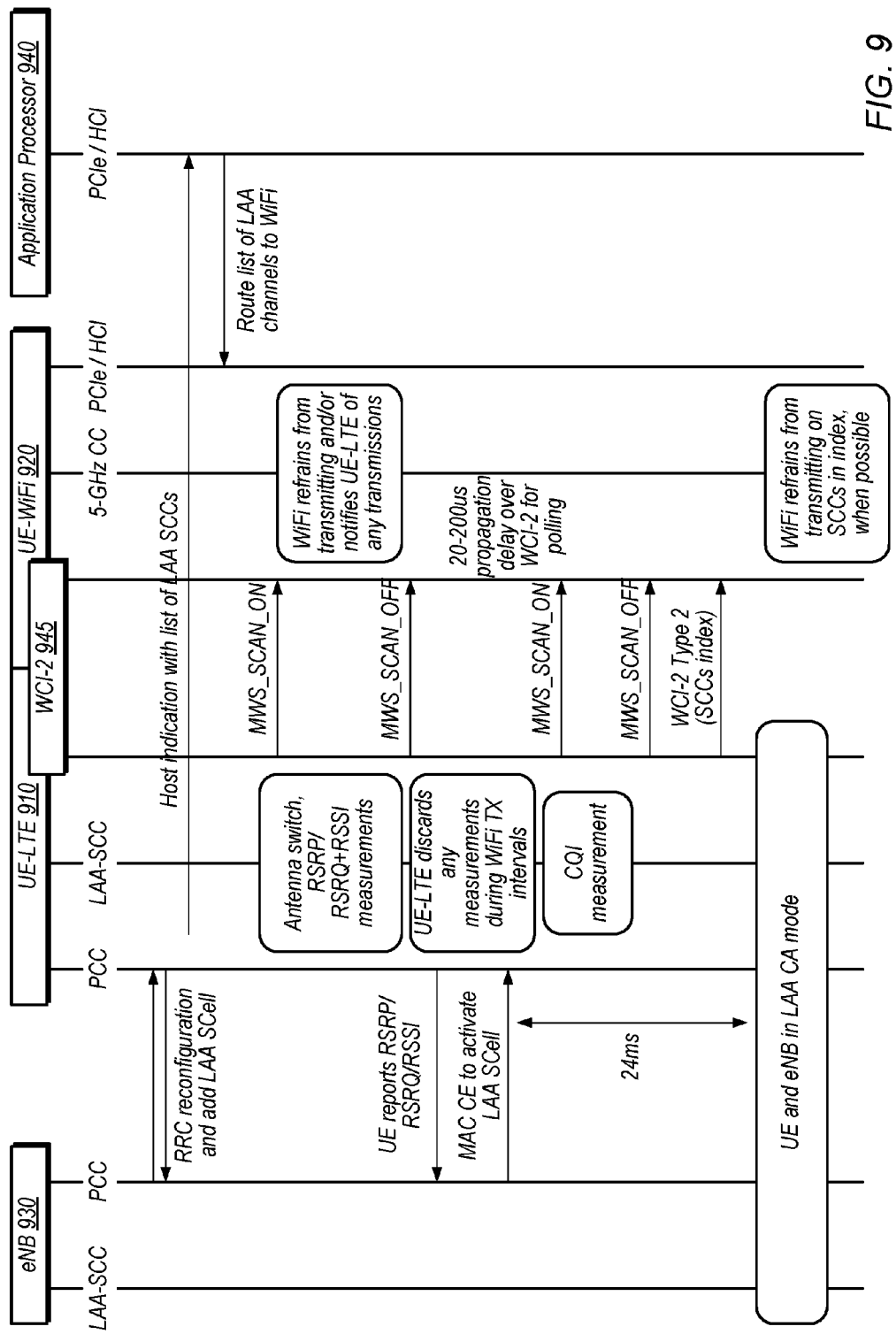
FIGS. 9-11 are communication diagrams illustrating exemplary communications between Wi-Fi and cellular processors, according to some embodiments.

FIG. 9 is a signaling diagram illustrating exemplary communications between an eNB 930 (e.g., a cellular base station), a UE-LTE module 910 (e.g., a cellular processor such as MWS device 810), a UE-Wi-Fi module 920 (e.g., a Wi-Fi processor), and an application processor 940, according to some embodiments.

eNB 930, in the illustrated embodiment, is configured to communicate via both primary component carriers (PCC) in licensed frequency bands and LAA secondary component carriers (SCC) in unlicensed frequency bands, including 5 GHz bands. eNB 930 may be implemented according to the embodiment of FIG. 4, in some systems.

Figure 10:
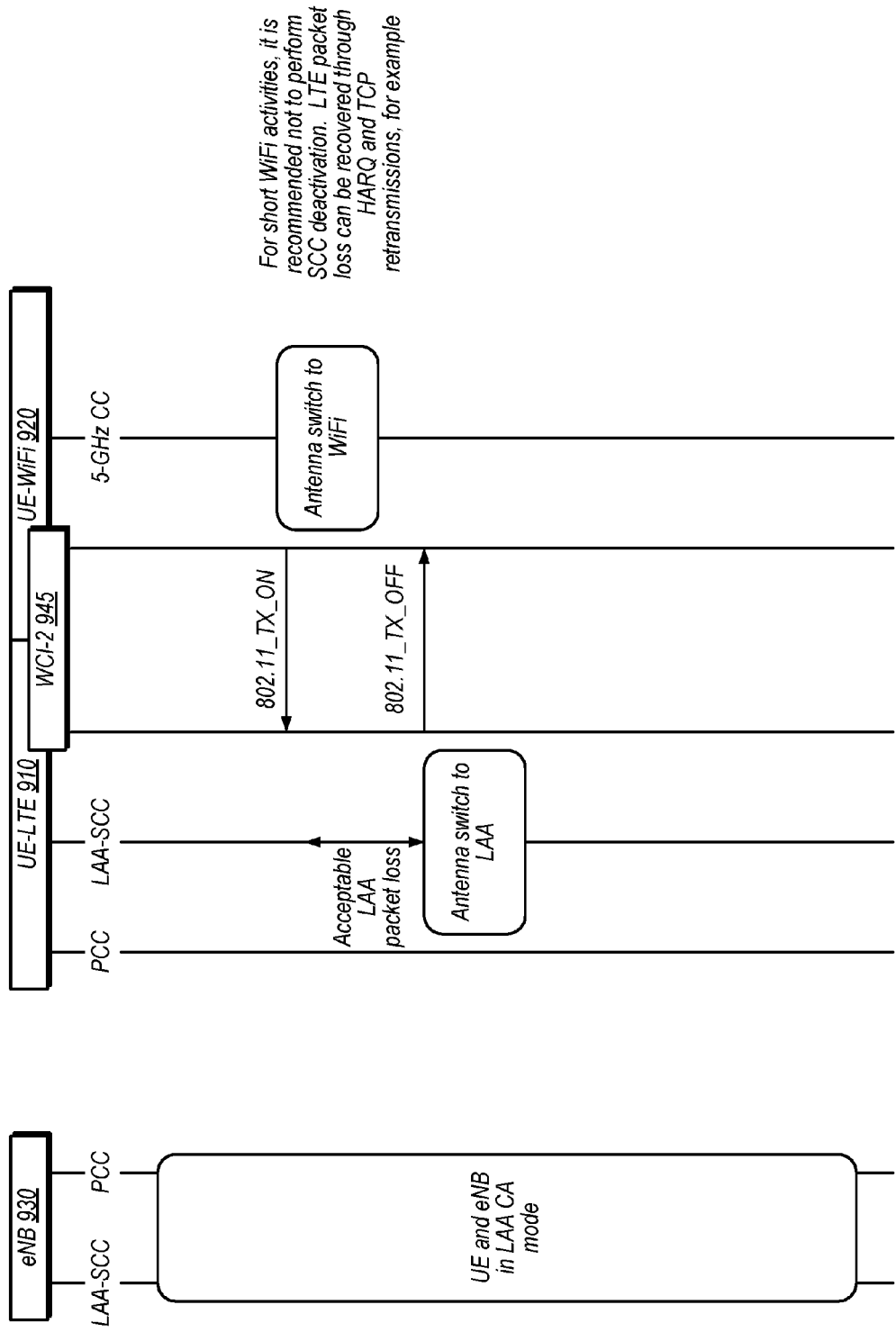
Figure 11:
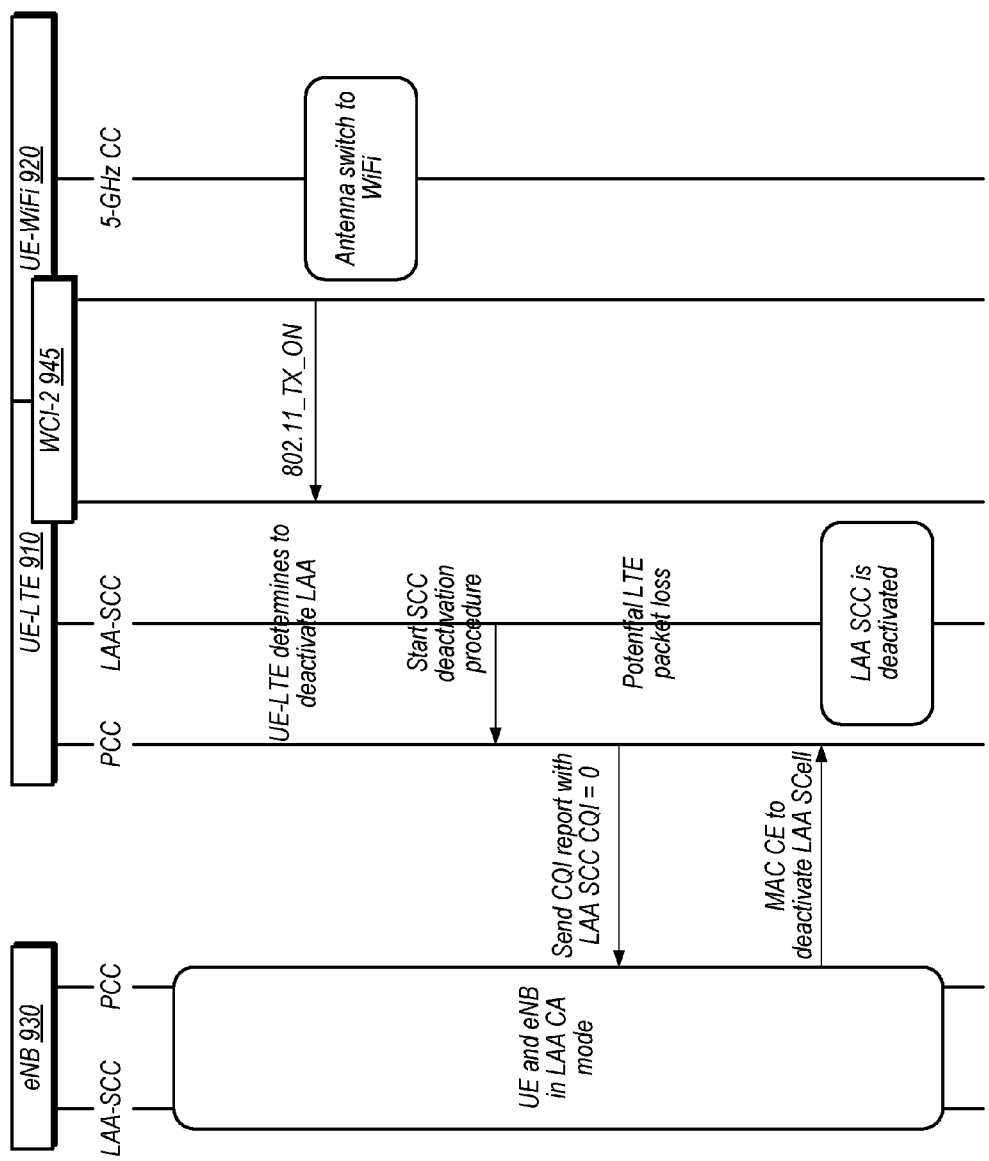

UE-LTE 910, in the illustrated embodiment, is configured to communicate with eNB 930 via PCCs and LAA-SCCs and is configured to communicate with UE-Wi-Fi 920 via WCI-2 945. UE-LTE 910 is also configured to communicate with application processor 940, in the illustrated embodiment, e.g., via a PCIe interface. UE-WI-FI 920, in the illustrated embodiment, is also configured to communicate with one or more wireless access points using one or more 5 GHz component carriers (CC) and is configured to communicate with application processor 940 via a PCIe/HCI interface. The signaling in FIGS. 9-11 is shown for purposes of explanation, but the types of messages, types of interfaces, ordering of messages, etc. may be different in other embodiments.

In the illustrated embodiment, eNB 930 and UE-LTE 910 perform RRC reconfiguration to add an LAA secondary cell (SCell) for the UE. Subsequently, UE-LTE 910 sends a host indication with a list of LAA SCCs to application processor 940, which routs the list of LAA channels to UE-Wi-Fi 920. In other embodiments, UE-LTE 910 may transmit the list of LAA channels directly to UE-Wi-Fi 920 rather than through an application processor. In some embodiments, the list of LAA channels includes channels that the eNB 930 is configured to use, but these channels may or may not be assigned to the UE.

Based on this list, UE-Wi-Fi 920 is configured to, in some embodiments, avoid operating in 5 GHz channels that may be used by UE-LTE 910 (e.g., channels in the list). LAA has an 8 ms transmission opportunity (TXOP) in some embodiments, so this may prevent interference between Wi-Fi transmission and LAA reception.

In the event that UE-Wi-Fi 920 does perform transmissions in a channel used for LAA by eNB 930 (e.g., for peer-to-peer to station/AP mode), UE-Wi-Fi 920 is configured to use a Wi-Fi multimedia (WMM) framework for quality of service management and the highest aggregation of media access control (MAC) protocol data units (PDUs) (this technique is often referred to as AMPDU), in some embodiments. This may help group Wi-Fi transmission into time intervals similar to the 8 ms LAA TXOP interval (e.g., ~5-8 ms Wi-Fi transmission blocks) which may in turn reduce interference with LAA reception via the shared antenna.

Referring again to FIG. 9, in conjunction with performing reference signal received power (RSRP), reference signal received quality (RSRQ), and/or received signal indicator (RSSI) determinations using the shared antenna, UE-LTE 910 sends a MWS_SCAN_ON message to UE-Wi-Fi 920 follows by a MWS_SCAN_OFF message when the scan is complete. These measurements may be for neighbor cells and may be performed at the request of eNB 930, in some embodiments. As shown, there may be a 20-200 us propagation delay over WCI-2 for these messages. As shown, UE-LTE 910 may then report the determined scan measurements to eNB 930 which may then send a MAC control element (CE) to activate the LAA secondary cell and activate the SCCs assigned to UE-LTE 910. As shown, UE-LTE 910 may also use the MMS_SCAN_ON and MWS_SCAN_OFF messages to signal beginning and end of CQI measurement process. In the illustrated embodiment, UE-LTE 910 also uses a WCI-2 Type-2 message to send an index of SCCs actually assigned and activated for the UE by eNB 930. Similar messages may be used subsequently to indicate SCCs that have been deactivated. Such messages may allow UE-Wi-Fi 920 to remain up to date on the LAA carriers currently assigned to UE-LTE 910. In the illustrated embodiment, 24 ms after the MAC CE element, the UE and eNB are ready to begin communicating in LAA CA mode.

In some embodiments, during intervals indicated by the MWS_SCAN_ON and MWS_SCAN_OFF messages, UE-Wi-Fi 920 is configured to avoid UL transmission completely in order to avoid interference with the LTE measurements. In some embodiments, Wi-Fi transmissions may still be performed during this interval, e.g., in response to an explicit user request to connect to a certain access point. In these embodiments, UE-Wi-Fi 920 may notify UE-LTE 910 of the transmission and UE-LTE 910 may be configured to discard any measurements performed during the Wi-Fi transmission. This may ensure the measurement reports on LAA channels are not degraded by Wi-Fi transmissions.

In some embodiments, when UE-Wi-Fi 920 has been notified of LAA activation for the UE, UE-Wi-Fi 920 is configured to reduce the rate of active scanning in the 5 GHz band (relative to an active scanning rate when LAA is not being used) to reduce the impact of such scans on LAA DL reception and/or to extend the dwell time of Wi-Fi active scan after sending a probe request. Similarly, in some embodiments when LAA is activated, UE-Wi-Fi 920 is configured not to send an acknowledgement (ACK) message in response to probe responses from an access point. This may further reduce interference with LAA reception, in some situations. As shown, Wi-Fi may refrain from transmitting on SCCs in the index when possible, e.g., by attempting to assign transmission to other channels.

In some embodiments, eNB 930 is configured to decide whether to activate an LAA Scell based on the amount of user data buffered in the eNB 930, whether the user have voice over LTE (VoLTE) or guaranteed bit rate (GBR)

traffic, and whether SCC activation has already happened within a timer interval). In some embodiments, eNB 930 is configured to activate LAA SCell only if the amount of buffered data is greater than a threshold, the user has no VoLTE or GBR traffic, and SCC activation has not occurred within a threshold interval.

FIG. 10 is a signal diagram illustrating exemplary communications during LAA activation, according to some embodiments. In the illustrated example, Wi-Fi does not cause LAA to be disabled. In contrast, FIG. 11 shows a situation where LAA is disabled based on Wi-Fi transmissions, according to some embodiments.

In various embodiments, any of various metrics may be used to determine when Wi-Fi transmission are potentially interfering with LAA reception. This may include, for example, determining whether a given Wi-Fi transmission is longer than a threshold interval, determining whether Wi-Fi transmissions over a time interval are greater than a threshold average transmission amount over the interval, determining actual LAA packet loss over one or more intervals, etc.

In some embodiments, lost LAA packets may be recovered using hybrid automatic repeat request (HARD) and transmission control protocol (TCP), especially if the Wi-Fi transmissions are relatively limited. At some point, however, LAA may need to be disabled due to packet loss.

Referring again to FIG. 10, UE-Wi-Fi 920 sends an 802.11_TX_ON message to UE-LTE 910 in conjunction with the antenna switching to Wi-Fi for Wi-Fi transmission and then sends an 802.11_TX_OFF message when the Wi-Fi transmissions are complete. The antenna is subsequently switched back for LAA use. In the illustrated embodiment, UE-LTE 910 determines, at least in part based on the WCI-2 messages from UE-Wi-Fi 920, that the packet loss is acceptable and maintains LAA CA as active.

In some embodiments, the initial message indicating that Wi-Fi transmission is occurring may also specify a duration of the transmission. Speaking generally, any of various encodings may be used to specify time intervals for transmissions, scanning, etc., including a start time and duration, a start and end signal, a start and end time (using any of various appropriate time encodings), etc. The illustrated begin and end messages (e.g., various "on" and "off" messages) in FIGS. 9-11 are included for purposes of illustration but are not intended to limit the scope of the present disclosure.

Referring now to FIG. 11, the Wi-Fi transmission causes an interruption threshold to be triggered (e.g., based on one or more of the metrics discussed above) and UE-LTE 910 starts a SCC deactivation procedure. In some embodiments, UE-LTE 910 starts the deactivation procedure a certain amount of time after receiving the TX_ON message if a TX_OFF message has not been received. In the illustrated embodiment, UE-LTE 910 sends a CQI report with the LAA SCC CQI=0 in order to cause eNB 930 to deactivate LAA SCell (using a MAC CE in the illustrated embodiment), after which LAA is deactivated. In other embodiments, other messages may be used to request LAA deactivation from eNB 930 such as a proprietary UL MAC CE or a 3GPP release 13 in device coexistence (IDC) message, for example. UE-LTE 910 may subsequently request to reactivate LAA SCCs (not shown), e.g., in response to a reduction in Wi-Fi transmissions. In some embodiments, similar techniques are used for reactivation procedures, using the same thresholds or different thresholds.

Figure 12B:
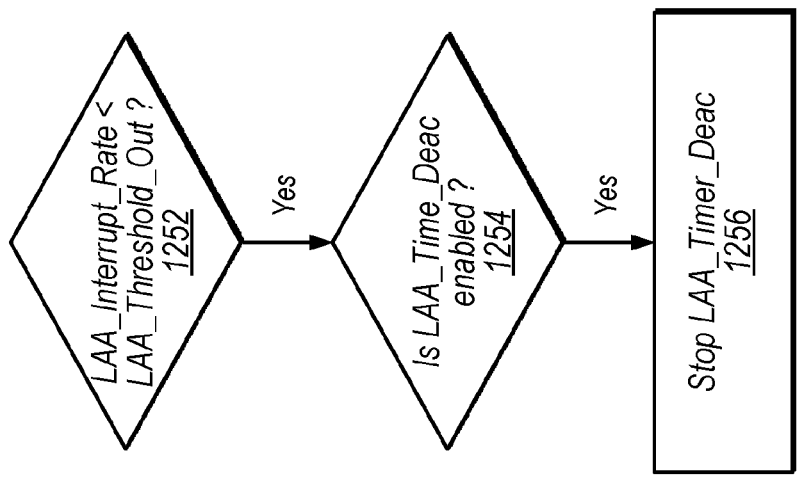
FIGS. 12A and 12B are flow chart diagrams illustrating an exemplary procedure for deciding whether the Wi-Fi transmission causes an interruption threshold to be triggered, according to some embodiments.
Figure 12A:
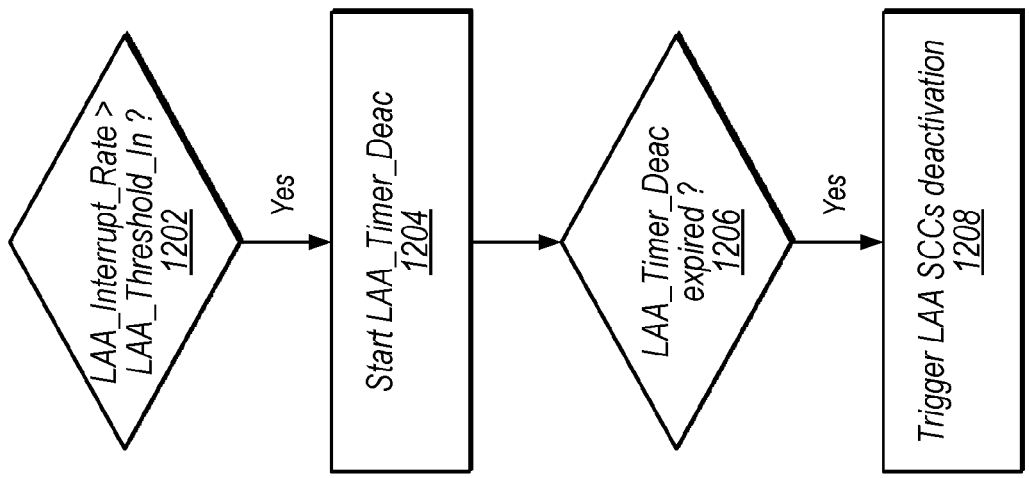

FIGS. 12A and 12B are flow chart diagrams illustrating an exemplary procedure for deciding whether the Wi-Fi transmission causes an interruption threshold to be triggered (e.g., within the scenario of FIG. 11), according to some embodiments. The procedure of FIGS. 12A and 12B may be implemented, e.g., by UE-LTE 910.

Referring first to FIG. 12A, at 1202 the UE-LTE 910 may determine whether a rate of interruption by the Wi-Fi transmission (LAA_Interrupt_Rate) exceeds (or meets) a start-timer threshold (LAA_Threshold_In). For example, LAA_Interrupt_Rate may be measured in terms of a number or percentage of TTIs interrupted by the Wi-Fi transmission within a particular window of time (e.g., within a 100 ms period). As one example, LAA_Threshold_in may be set as 20% of the TTIs within the window of time. The UE-LTE 910 may determine whether a given TTI within the window of time is interrupted according to the procedures described above.

At 1204, in response to determining that LAA_Interrupt_Rate exceeds (or meets) LAA_Threshold_In, the UE-LTE 910 may start a deactivation timer (LAA_Timer_Deac). LAA_Timer_Deac may be configured to measure weather a period of high interference from the Wi-Fi transmission exceeds (or meets) a predefined threshold. As one example, LAA_Timer_Deac may expire after 500 ms.

At 1206, the UE-LTE 910 may determine whether LAA_Timer_Deac has expired. If so, the UE-LTE 910 may, at 1208, initiate a SCC deactivation procedure, e.g., as illustrated in FIG. 11.

Referring now to FIG. 12B, at 1252 the UE-LTE 910 may determine whether LAA_Interrupt_Rate fails to exceed (e.g., drops below) a stop-timer threshold (LAA_Threshold_Out). As one example, LAA_Threshold_Out may be set as 10% of the TTIs within the window of time. Setting LAA_Threshold_Out to a value lower than LAA_Threshold_In may provide a hysteresis function in determining whether to initiate the SCC deactivation procedure.

In response to determining that LAA_Interrupt_Rate is below LAA_Threshold_Out, the UE-LTE 910 may, at 1254, determine whether LAA_Time_Deac is enabled. If LAA_Time_Deac is enabled, then the UE-LTE 910 may stop LAA_Timer_Deac, such that the SCC deactivation procedure is not initiated (e.g., the determination of step 1206 is not met).

In various embodiments, the disclosed techniques may reduce interference (which may in turn increase performance) of LAA and Wi-Fi communications using a shared antenna.

Exemplary in-Device Coexistence Call Flow

In some embodiments in place of (or in addition to) using CQI=0 reporting to deactivate LAA, new signaling is used in an in-device coexistence (IDC) framework to inform a mobile device of LAA RX unavailability. This may remove dependency on periodic CQI configuration by the network, in some embodiments, which may degrade user experience in certain situations. In some embodiments, the network is configured to use the IDC techniques discussed below with reference to FIG. 13 unless a mobile device does not support these techniques, in which case the network may use the CQI=0 techniques discussed above.

Figure 13:
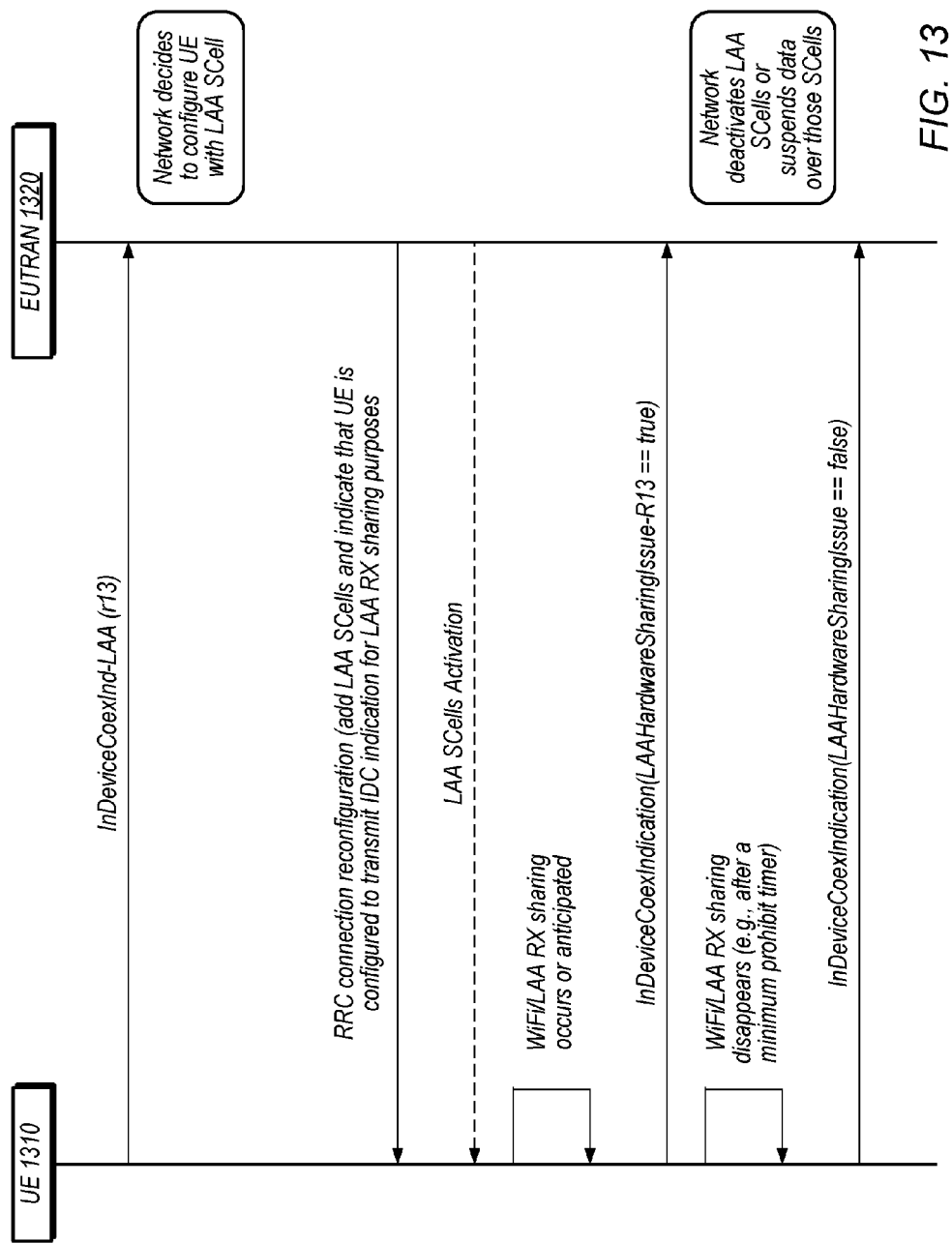
FIG. 13 is a communication diagram illustrating an exemplary procedure for using IDC indications, according to some embodiments.

FIG. 13 is a signal diagram illustrating exemplary IDC communications relating to LAA activation, according to some embodiments. In the illustrated embodiment, UE 1310 sends an InDeviceCoexInd-LAA (r13) message to EUTRAN 1320, based on which the network decides to configure UE 1310 with one or more LAA SCells. The network then sends an RRC connection reconfiguration message to UE 1310 that adds one or more LAA SCells and indicates that the UE is configured to transmit IDC indications for LAA RX sharing purposes. The network also activates the LAA SCells.

Subsequently, in the illustrated example UE 1310 determines that WiFi LAA receive sharing is occurring or anticipated and, in response, sends an InDeviceCoexIndication message with a sharing issue field (LAAHardwareSharingIssue-R13) set to true. In response, the network deactivates the LAA SCells or suspends data transmission for UE 1310 over those SCells.

Subsequently, in the illustrated example, the WiFi RX sharing no longer occurs and the UE 1310 sends an InDeviceCoexIndication message with a sharing issue field set to false (this may allow the network to configured LAA SCells for the UE and/or resume data transmission for the UE on the SCells).

In some embodiments, the UE is configured to start a timer in response to determining that, during a first period of time, transmission by the WLAN processor via the antenna has interrupted transmission by the cellular processor within the first frequency band via the antenna at a rate meeting a first threshold and determine to request deactivation of communications via the first frequency band in response to expiration of the timer. In some embodiments, the UE is configured to stop the timer in response to determining that, during a second period of time, transmission by the WLAN processor via the antenna has interrupted transmission by the cellular processor within the first frequency band via the antenna at a rate lower than a second threshold.

Exemplary Methods

Figure 14:
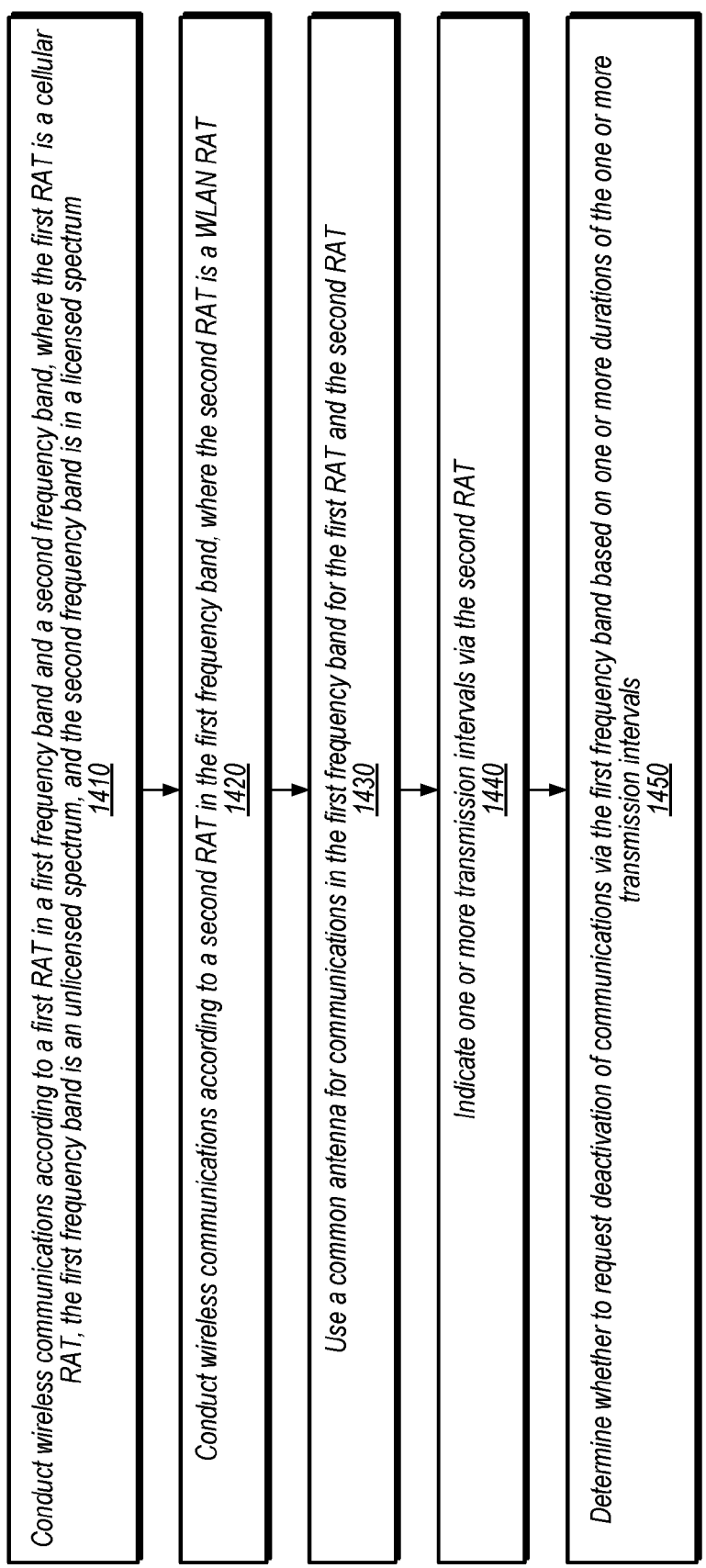
FIGS. 14-16 are flow diagrams illustrating exemplary techniques for using coexistence information, according to some embodiments.

FIG. 14 is a flow diagram illustrating a method for using coexistence information, according to some embodiments. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1410, in the illustrated embodiment, a first processing element (e.g., cellular controller 352) conducts wireless communications according to a first RAT in a first frequency band and a second frequency band, where the first RAT is a cellular RAT, the first frequency band is an unlicensed spectrum, and the second frequency band is in a licensed spectrum.

At 1420, in the illustrated embodiment, a second processing element (e.g., Wi-Fi controller 350) conducts wireless communications according to a second RAT in the first frequency band, where the second RAT is a WLAN RAT. Note that the first and second processing elements may or may not be the same processing element.

At 1430, in the illustrated embodiment, the first and second processing elements that perform method elements 1410 and 1420 use a common antenna for communications in the first frequency band for the first RAT and the second RAT.

At 1440, in the illustrated embodiment, the second processing element indicates one or more transmission intervals via the second RAT.

At 1450, in the illustrated embodiment, the first processing element determines whether to request deactivation of communications via the first frequency band based on one or more durations of the one or more transmission intervals. For example, if requesting deactivation, the first processing element may communicate with a base station to make the request. For example, the first processing element may send a CQI report with a CQI of zero to request deactivation. In some embodiments, the first processing element may send a DCI message to request deactivation.

The cellular communications in the first frequency band may be LAA communications. The first and second processing elements may communicate via a WCI interface. The first frequency band may be a 5 GHz band.

Figure 15:
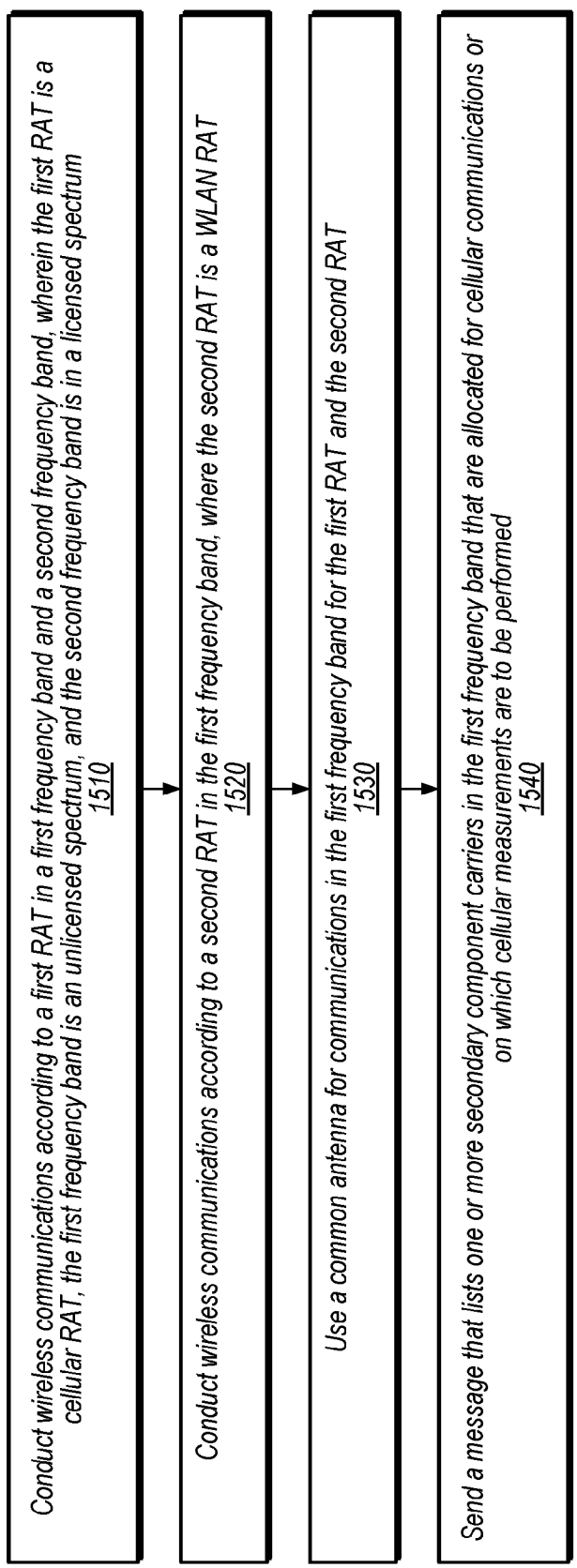

FIG. 15 is a flow diagram another method for using coexistence information, according to some embodiments. The method shown in FIG. 15 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

Method elements 1510-1530 correspond to method elements 1410-1430 of FIG. 14, in the illustrated embodiment.

At 1540, in the illustrated embodiment, the cellular processor sends a message that lists one or more secondary component carriers in the first frequency band that are allocated for cellular communications or on which cellular measurements are to be performed. In some embodiments, the one or more secondary component carriers are used by one or more neighboring base stations rather than a serving base station, for example.

In some embodiments, based on this indication, the WLAN processor is configured to avoid transmitting on ones of the secondary component carriers allocated to the cellular processor in response to the message. In some embodiments, the WLAN processor is configured, in response to the message, to refrain from sending acknowledgements to ones or more probes from a wireless access point in the first frequency band. In some embodiments, the WLAN processor is configured to reduce a rate of active scanning in the first frequency band in response to the message. In some embodiments, the WLAN processor is configured to use an increase aggregation of media access control protocol data units (AMPDU) in response to the message. In some embodiments, the cellular processor is configured to send the message to the WLAN processor via an application processor.

Figure 16:
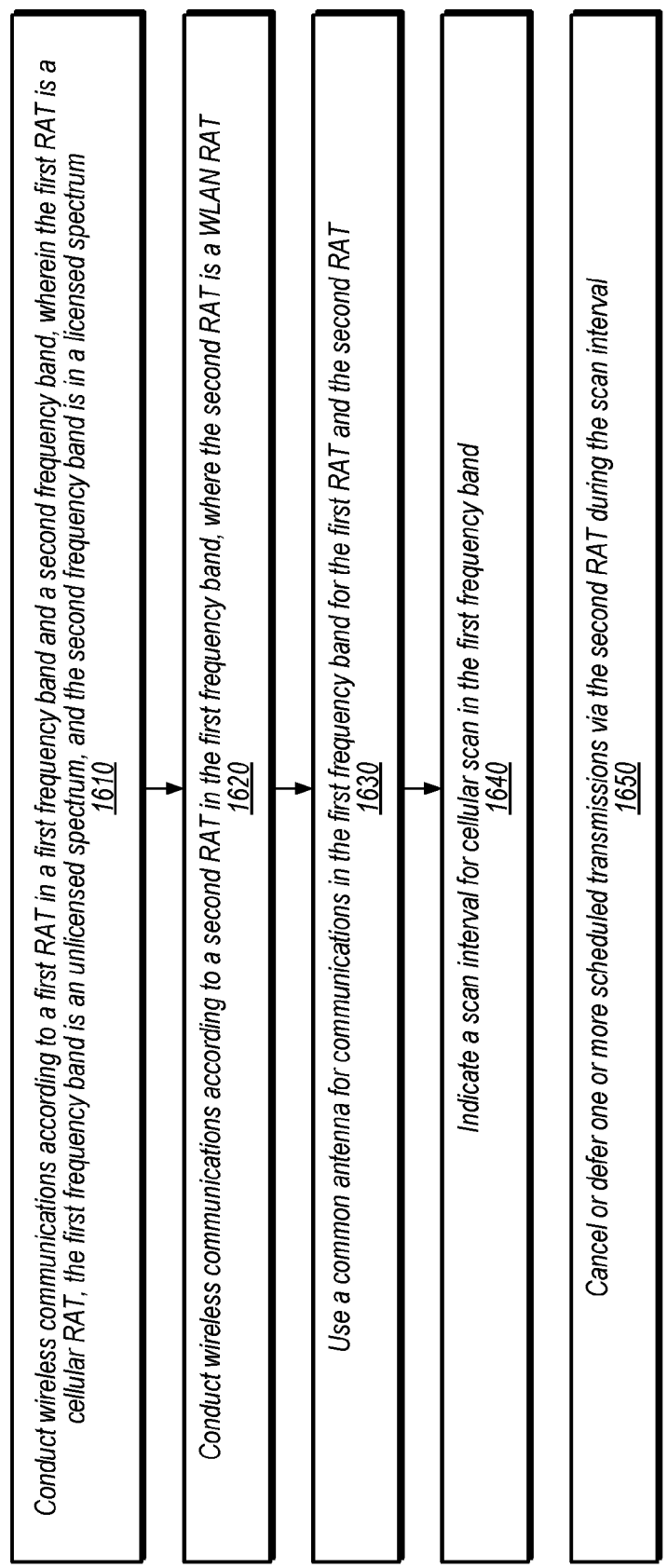

FIG. 16 is a flow diagram another method for using coexistence information, according to some embodiments. The method shown in FIG. 16 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

Method elements 1610-1630 correspond to method elements 1410-1430 of FIG. 14, in the illustrated embodiment.

At 1640, in the illustrated embodiment, the cellular processor indicates a scan interval for a cellular scan in the first frequency band.

At 1650, in the illustrated embodiment, the WLAN processor cancels or defers one or more scheduled transmissions via the second RAT during the scan interval. In some embodiments, the WLAN processor may determine not to defer one or more transmissions during the interval (e.g., based on a duration of the scan interval, other information about the scan interval, and/or characteristics of the scheduled transmissions, for example). In some embodiments, the WLAN process is configured to notify the cellular processor if it transmits during the interval. In some embodiments, in response to the notification that the WLAN processor transmitted during the interval, the cellular processor is configured to ignore one or more scan measurements taken during an interval in which the WLAN processor transmitted.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 17B:
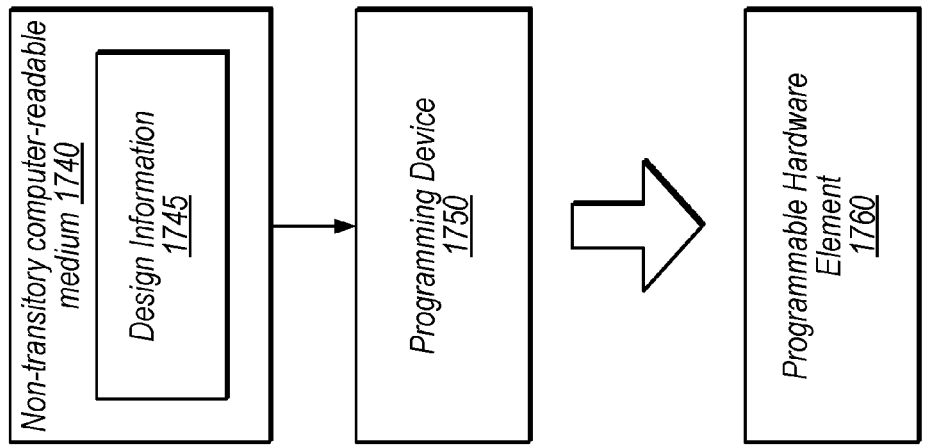
FIGS. 17A and 17B are diagrams illustrating exemplary computer readable media, according to some embodiments.
Figure 17A:
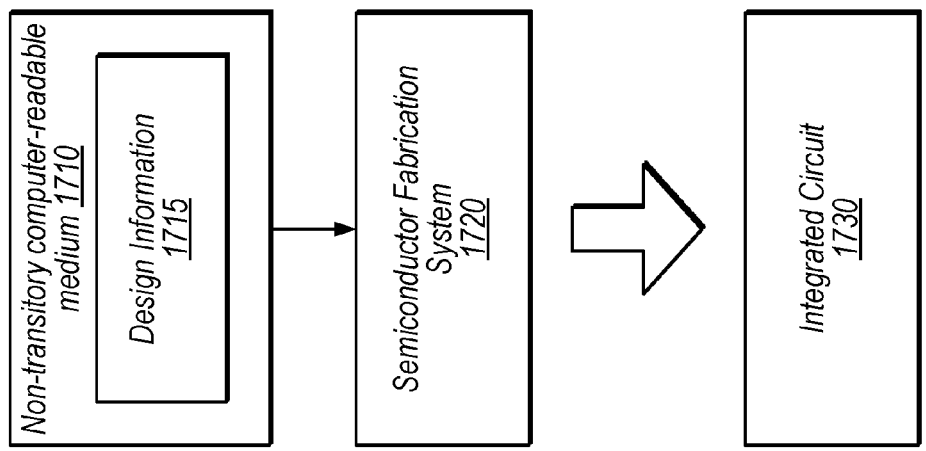

FIG. 17A is a block diagram illustrating an exemplary non-transitory computer-readable storage medium that stores circuit design information, according to some embodiments. In the illustrated embodiment semiconductor fabrication system 1720 is configured to process the design information 1715 stored on non-transitory computer-readable medium 1710 and fabricate integrated circuit 1730 based on the design information 1715.

Non-transitory computer-readable medium 1710, may comprise any of various appropriate types of memory devices or storage devices. Medium 1710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 1710 may include other types of non-transitory memory as well or combinations thereof. Medium 1710 may include two or more memory mediums which may reside in different locations, e.g., in different computer systems that are connected over a network.

Design information 1715 may be specified using any of various appropriate computer languages, including hardware description languages such as, without limitation: VHDL, Verilog, SystemC, SystemVerilog, RHDL, M, MyHDL, etc. Design information 1715 may be usable by semiconductor fabrication system 1720 to fabrication at least a portion of integrated circuit 1730. The format of design information 1715 may be recognized by at least one semiconductor fabrication system 1720. In some embodiments, design information 1715 may also include one or more cell libraries which specify the synthesis and/or layout of integrated circuit 1730. In some embodiments, the design information is specified in whole or in part in the form of a netlist that specifies cell library elements and their connectivity.

Semiconductor fabrication system 1720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1720 may also be configured to perform various testing of fabricated circuits for correct operation.

In various embodiments, integrated circuit 1730 is configured to operate according to a circuit design specified by design information 1715, which may include performing any of the functionality described herein. For example, integrated circuit 1730 may include any of various elements shown herein. Further, integrated circuit 1730 may be configured to perform various functions described herein in conjunction with other components. Further, the functionality described herein may be performed by multiple connected integrated circuits.

FIG. 17B is a block diagram illustrating an exemplary non-transitory computer-readable storage medium that stores design information for a programmable hardware element, according to some embodiments. In the illustrated embodiment programming device 1750 is configured to process the design information 1745 stored on non-transitory computer-readable medium 1740 and program programmable hardware element 1760 based on the design information 1745.

Medium 1740 and design information 1745 may have features similar to medium 1710 and design information 1715, as discussed above. Hardware description languages used to design ASICs may be similar or different than those used to program programmable hardware elements. Programmable hardware element 1760 may be a field-programmable gate array (FPGA), programmable logic array (PLA), complex programmable logic device (CPLD) etc. Programmable hardware element 1760 may include logic blocks, hard blocks for common functions, configurable clocking structures, memories, fuses, etc. A given programmable hardware element 1760 may be programmed differently at different times, e.g., by adjusting the functionality of the logic blocks, interconnections between circuit elements, etc.

In various embodiments, programmable hardware element 1760 is configured, after being programmed, to operate according to the circuit design specified by design information 1745, which may include performing any of the functionality described herein. For example, programmable hardware element 1760 may implement any of various elements shown herein. Further, programmable hardware element 1760 may be configured to perform various functions described herein in conjunction with other components. Further, the functionality described herein may be performed by multiple connected programmable hardware elements.

As used herein, the term "implement the circuit according to the design" includes both fabricating an integrated circuit according to the design and programming a programmable hardware element according to the design. Semiconductor fabrication system 1720 and programming device 1750 are examples of computing systems configured to implement circuits according to design information. Speaking generally, implementing a circuit according to a design may include other ways to implement hardware circuits in addition to the techniques discussed with references to FIGS. 17A and 17B. This term is intended to cover all such techniques for implementing hardware circuits according to design information stored in a computer-readable medium.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Disclosed embodiments may be realized in any of various forms. For example, in some embodiments, the disclosed techniques be realized as a computer-implemented method, a computer-readable memory medium, or a computer system. In other embodiments, disclosed techniques may be realized using one or more custom-designed hardware devices such as ASICs. In other embodiments, disclosed techniques may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a cellular processor configured to conduct wireless communications according to a first radio access technology (RAT) in a first frequency band and in a second frequency band, wherein the first RAT is a cellular RAT, the first frequency band is in an unlicensed spectrum, and the second frequency band is in a licensed spectrum;
a wireless local area network (WLAN) processor configured to conduct wireless communications according to a second RAT in the first frequency band, wherein the second RAT is a wireless local area network (WLAN) RAT; and
one or more internal communication lines connecting the cellular processor and the WLAN processor;
wherein the cellular processor and the WLAN processor are configured to couple to a same antenna for communications in the first frequency band;
wherein the cellular processor is configured to notify the WLAN processor via the one or more internal communication lines when the cellular processor is beginning a scan and when the cellular processor is ending a scan in the first frequency band;
wherein the WLAN processor is configured to determine whether to cancel or defer one or more scheduled transmissions during an interval starting at the beginning of the scan and ending at the end of the scan;
wherein, in response to a determination to perform one or more transmissions during the interval, the WLAN processor is configured to notify the cellular processor that the WLAN processor transmitted during the interval; and wherein, in response to the notification that the WLAN processor transmitted during the interval, the cellular processor is configured to ignore one or more scan measurements taken during an interval in which the WLAN processor transmitted.

2. The apparatus of claim 1,
wherein the WLAN processor is configured to indicate one or more transmission intervals by notifying the cellular processor, via the one or more internal communication lines, when the WLAN processor is transmitting via the antenna; and
wherein the cellular processor is configured to determine whether to request, from a cellular network, deactivation of communications via the first frequency band based on one or more durations of the one or more transmission intervals.

3. The apparatus of claim 2,
wherein the cellular processor is configured to send a message to the WLAN processor in response to allocation of one or more secondary component carriers in the first frequency band being allocated to the cellular processor by a cellular base station or in response to an indication from the base station to perform measurements on one or more secondary component carriers in the first frequency band.

4. The apparatus of claim 2, wherein the cellular processor is configured to request deactivation of communications via the first frequency band by sending a channel quality indication (CQI) report to a cellular base station that has a CQI of zero for one or more secondary component carriers in the first frequency band.

5. The apparatus of claim 2, wherein the cellular processor is configured to request deactivation of communications via the first frequency band by sending an in-device coexistence (IDC) message to a cellular base station.

6. The apparatus of claim 2, wherein cellular communications by the cellular processor in the first frequency band are license-assisted access (LAA) communications.

7. The apparatus of claim 2, wherein the WLAN processor is configured to indicate the one or more transmission intervals using a wireless-coexistence interface (WCI).

8. The apparatus of claim 2, wherein, in determining whether to request deactivation of communications via the first frequency band, the cellular processor is further configured to:
start a timer in response to determining that, during a first period of time, transmission by the WLAN processor via the antenna has interrupted transmission by the cellular processor within the first frequency band via the antenna at a rate meeting a first threshold; and
determine to request deactivation of communications via the first frequency band in response to expiration of the timer.

9. The apparatus of claim 8, wherein, to determine whether to request deactivation of communications via the first frequency band, the cellular processor is further configured to:
stop the timer in response to determining that, during a second period of time, transmission by the WLAN processor via the antenna has interrupted transmission by the cellular processor within the first frequency band via the antenna at a rate lower than a second threshold.

10. The apparatus of claim 1, wherein the first frequency band is an unlicensed 5 GHz band and the second frequency band is a licensed cellular band.

11. The apparatus of claim 1, wherein a single processor executing different programs is configured to implement both the cellular processor and the WLAN processor.

12. A method, comprising:
   conducting, by a cellular processor, wireless communications according to a first radio access technology (RAT) in a first frequency band and in a second frequency band, wherein the first RAT is a cellular RAT, the first frequency band is in an unlicensed spectrum, and the second frequency band is in a licensed spectrum;
   conducting, by a wireless local area network (WLAN) processor, wireless communications according to a second RAT in the first frequency band, wherein the second RAT is a wireless local area network (WLAN) RAT, wherein the communications by the cellular processor and the WLAN processor in the first frequency band use a common antenna;
   notifying, by the cellular processor, when the cellular processor is beginning a scan and when the cellular processor is ending a scan in the first frequency band;
   notifying, by the WLAN processor in in response to a determination not to defer one or more transmissions during the scan, the cellular processor that the WLAN processor transmitted during the scan; and
   discarding, by the cellular processor, one or more scan measurements taken during an interval in which the WLAN processor transmitted.

13. The method of claim 12, further comprising:
   indicating, by the WLAN processor, one or more transmission intervals by notifying the cellular processor, via one or more physical communication lines connecting the cellular processor and the WLAN processor, when the WLAN processor is transmitting via the antenna; and
   determining, by the cellular processor, whether to request deactivation of communications via the first frequency band based on one or more durations of the one or more transmission intervals.

14. A non-transitory computer-readable medium having instructions stored thereon that are executable by a computing device to perform operations comprising:
   conducting, by a cellular processor, wireless communications according to a first radio access technology (RAT) in a first frequency band and in a second frequency band, wherein the first RAT is a cellular RAT, the first frequency band is in an unlicensed spectrum, and the second frequency band is in a licensed spectrum;
   conducting, by a wireless local area network (WLAN) processor, wireless communications according to a second RAT in the first frequency band, wherein the second RAT is a wireless local area network (WLAN) RAT, wherein the communications by the cellular processor and the WLAN processor in the first frequency band use a common antenna;
   notifying, by the cellular processor, when the cellular processor is beginning a scan and when the cellular processor is ending a scan in the first frequency band;
   notifying, by the WLAN processor in in response to a determination not to defer one or more transmissions during the scan, the cellular processor that the WLAN processor transmitted during the scan; and
   discarding, by the cellular processor, one or more scan measurements taken during an interval in which the WLAN processor transmitted.

15. The non-transitory computer-readable medium of claim 14, wherein the operations further comprise:
   indicating, by the WLAN processor, one or more transmission intervals by notifying the cellular processor, via one or more physical communication lines connecting the cellular processor and the WLAN processor, when the WLAN processor is transmitting via the antenna; and
   determining, by the cellular processor, whether to request deactivation of communications via the first frequency band based on one or more durations of the one or more transmission intervals.

16. The non-transitory computer-readable medium of claim 15, wherein the operations further comprise:
   sending, by the cellular processor, a message to the WLAN processor in response to allocation of one or more secondary component carriers in the first frequency band being allocated to the cellular processor by a cellular base station or in response to an indication from the base station to perform measurements on one or more secondary component carriers in the first frequency band.

17. The non-transitory computer-readable medium of claim 15, wherein the requesting deactivation of communications via the first frequency band by sending an in-device coexistence (IDC) message to a cellular base station.

* * * * *